Figure 1:
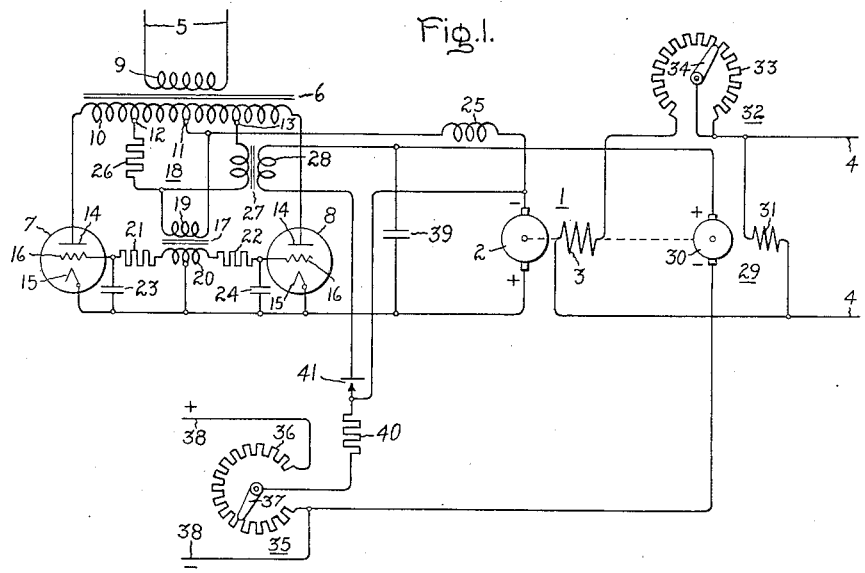

March 18, 1941.  G. W. GARMAN  2,235,551
ELECTRIC CONTROL SYSTEM
Original Filed Nov. 24, 1937

Inventor:
George W. Garman,
by Harry E. Dunham
His Attorney.

Patented Mar. 18, 1941

2,235,551

UNITED STATES PATENT OFFICE 2,235,551

ELECTRIC CONTROL SYSTEM

George W. Garman, Scotia, N. Y., assignor to General Electric Company, a corporation of New York Original application November 24, 1937, Serial No. 176,281. Divided and this application July 15, 1938, Serial No. 219,381

5 Claims. (Cl. 171—119)

My invention relates to electric control systems and more particularly to electric valve control systems for dynamo-electric machines.

This application is a division of my copending application Serial No. 176,281 filed November 24, 1937 and assigned to the assignee of the present application.

In many industrial operations or processes it is frequently desirable to control an operation by means of an electric motor, the speed of which is precisely and accurately determinable. For example, in many applications it is desirable to energize a direct current motor from an associated alternating current circuit through electric valve means and to maintain the speed of the motor at a definite predetermined speed. Heretofore many of the prior art arrangements which have been employed for this purpose have entailed the use of complicated and expensive control equipment and have been susceptible to objectionable variations in speed. Furthermore, it has become desirable to provide control apparatus which is entirely electrical in nature and operation and which is free of moving or vibrating contacts. In addition, it is important in order to obtain precise control to dispense with the use of mechanical speed responsive devices because of the inherent limitations of such arrangements.

It is an object of my invention to provide a new and improved electric control system.

It is another object of my invention to provide a new and improved electric valve control system for dynamo-electric machines.

It is a further object of my invention to provide a new and improved control system for electric valve insulating apparatus for energizing a direct current motor from an alternating current supply circuit.

In accordance with one of the illustrated embodiments of my invention, I provide an improved control circuit for controlling an operating characteristic, such as the speed, of a direct current motor. A direct current motor is energized from an alternating current supply circuit through electric valve translating apparatus including electric valves having control members for controlling the conductivities thereof. An auxiliary dynamo-electric machine or a pilot generator is directly connected to the direct current motor to provide a unidirectional voltage which varies in accordance with the speed of the motor. The output voltage of the pilot generator acts in opposition to a source of reference potential, and the resultant or different voltage is introduced in the excitation circuit for the control members of the electric valves to control the conductivities of the electric valves in accordance with the speed of the motor, thereby controlling the voltage impressed on the armature of the direct current motor. A serially connected capacitance and resistance are connected in series relation with the source of reference potential and the armature of the pilot generator to delay the rate of change of the resultant voltage impressed on the control members of the electric valves, and hence serve as a damping means when the direct current motor speed undergoes sudden variations. The phase of the voltage impressed on the control members of the electric valve means is controlled by means of a phase shifting circuit of the static impedance type. The phase shifting circuit includes a variable impedance, such as an inductance of the saturable type, having a control winding which is energized in accordance with the difference between a source of reference potential and the unidirectional voltage produced by the pilot generator. An anti-hunting means is connected in circuit with the source of reference potential and the pilot generator to control the rate of change of the current transmitted to the control winding of the variable impedance element.

Figure 2:
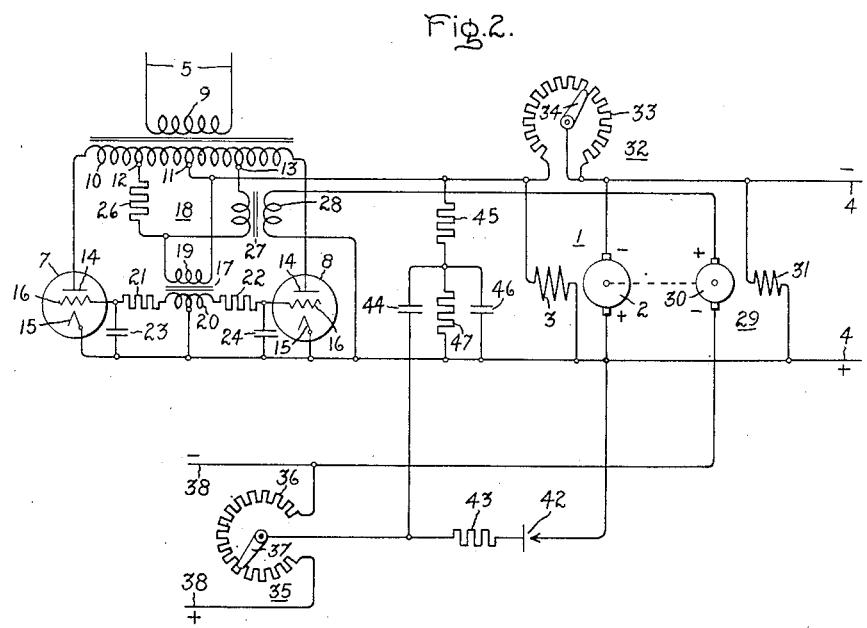

For a better understanding of my invention reference may be had to the following description taken in connection with the accompanying drawing, and its scope will be pointed out in the appended claims. Figs. 1 and 2 diagrammatically illustrate embodiments of my invention as applied to a system for controlling the speed of a motor of the direct current type.

Referring now to Fig. 1 of the drawing, my invention is diagrammatically illustrated as applied to an electric valve control system for a dynamo-electric machine 1 of the direct current type having an armature 2 and a field winding 3. The field winding 3 may be energized from any suitable source of direct current 4. Armature 2 of machine 1 is energized from an alternating current circuit 5 through a transformer 6 and through electric valves 7 and 8. The transformer 6 comprises a primary winding 9 and a secondary winding 10 provided with electrically intermediate connections 11, 12 and 13. The electric valves 7 and 8 are preferably of the type employing an ionizable medium such as a gas or a vapor and each comprises an anode 14, a cathode 15 and a control means or member 16. One terminal of the direct current armature 2 of machine 1 is connected to the intermediate connection 11 of secondary winding 10, and the other terminal thereof is connected to the common connection of cathodes 15 of electric valves 7 and 8.

To impress on control members 16 of electric valves 7 and 8 alternating voltages of predetermined phase displaced relative to the respective anode voltages, I employ an excitation circuit including a transformer 17 which may be energized from secondary winding 10 of transformer 6 through a suitable phase shifting circuit 18. The transformer 17 is provided with a primary winding 19 and a secondary winding 20. Current limiting resistances 21 and 22 are connected in series relation with control members 16 of electric valve means 7 and 8, respectively. Capacitances 23 and 24 may be connected across the cathodes 15 and control members 16 of electric valves 7 and 8, respectively to absorb extraneous transient voltages. A smoothing reactance 25 may be connected in series relation with the armature 2 of the motor 1.

In order to control the conductivities of the electric valves 7 and 8 in accordance with an operating condition or an electrical characteristic of the direct current motor 1, the phase shifting circuit 18 is arranged to impress on the control members 16 of electric valves 7 and 8 a periodic voltage or an alternating voltage variable in phase with respect to the anode-cathode voltages of these electric valves. The phase shifting circuit 18 may be of the static impedance phase shifting type and may include a serially connected resistance 26 and a variable impedance member, such as an inductance 27 which may be of the saturable type. The serially connected resistance 26 and the inductance 27 may be connected to terminals or taps 12 and 13 of winding 10. The variable inductance element 27 is provided with a control winding 28 which is energized in a manner described hereinafter.

As an agency for controlling the phase of the resultant voltages impressed on the control members 16 of electric valves 7 and 8 in accordance with a predetermined controlling influence derived from the dynamo-electric machine 1, I employ a voltage source variable in accordance with the condition to be controlled. The voltage source may comprise an auxiliary dynamo-electric machine 29 which may be termed a pilot generator. The pilot generator 29 may be of the direct current type having an armature member 30 and a field winding 31 which may be energized from any suitable source of direct current and which is shown as being connected to the direct current circuit 4.

A voltage divider 32 including a resistance 33 may be connected in series relation with the direct current circuit 4 and the field winding 3 of the direct current motor 1 and serves as a means for controlling the energization of the field winding. The voltage divider 32 may be provided with an adjustable contact 34.

I provide a voltage divider 35, comprising a resistance 36 and an adjustable contact 37, for producing a variable or an adjustable source of reference potential against which the output voltage of the pilot generator 29 acts. The voltage divider 35 may be energized from any suitable source of unidirectional voltage 38. It will be noted that the voltage of the voltage divider 35 and the voltage of the pilot generator 29 act in opposition to control the resultant current transmitted to the control winding 28 of the variable inductance element 27 of the phase shifting circuit 18.

As an agency for controlling the energization of the control winding 28 of the saturable inductive element 27 in accordance with the rate of change of voltage applied to the armature 2 of motor 1, I provide an anti-hunting means or damping circuit comprising a serially connected capacitance 39 and a resistance 40. A unidirectional conducting device 41 is connected in series relation with the control winding 28. The capacitance 39, resistance 40 and armature 30 of the pilot generator 29 are connected in series relation across armature 2 of motor 1. The voltage appearing across the terminals of the resistance 40 is in a direction tending to oppose that introduced into the circuit by the pilot generator 29 and occasioned by variations in the speed of the direct current motor 1. The voltage divider 35 is adjusted so that the voltage supplied thereby is greater than that produced by the pilot generator 29.

The operation of the embodiment of my invention shown in Fig. 1 will be explained by considering the system when dynamo-electric machine 1 is operating as a direct current motor and when the armature 2 thereof is variably energized from the alternating current circuit 5. A variable unidirectional current is transmitted to the armature 2 of motor 1 through electric valves 7 and 8 which operate as a controlled rectifier.

The manner in which the electric valves 7 and 8 control the voltage impressed on the armature 2 of the motor 1 will be well understood by those skilled in the art. For a given positive anode voltage there is a certain value of grid voltage which is termed the control grid voltage. When the grid voltage is more negative than this value, current cannot flow between anode and cathode. If the grid voltage is more positive than this critical value, current can flow and the magnitude of the current will be determined by the extent of resistance of the associated circuit. Once this circuit is established between anode and cathode in the usual commercial arrangement, the grid can exert no further control unless the anode voltage is reduced to a value near zero. When the anode voltage becomes zero, the current flow ceases and if the grid is sufficiently negative it can then prevent the current from re-starting. Therefore, when the voltage is applied between the cathode and anode, the grid can regain control once during each cycle and can, therefore, be used to prevent current flow when the anode is positive.

The impedance phase shifting circuit 18 impresses on the control members or grids 16 of electric valves 7 and 8 alternating voltages variable in phase to control the conductivities thereof in accordance with the speed of the motor 1, tending to maintain the speed at a predetermined constant value. The output voltage of the pilot generator 29 varies in accordance with the speed of the direct current motor 1 and hence variably energizes the control winding 28 of the saturable reactor 27 in accordance with the variations in speed tending to maintain the speed constant. The contact 37 of the voltage divider 35 is adjusted so that the output voltage thereof is greater than the output voltage of the pilot generator 29. The control winding 28 is energized through a circuit including the lower portion of resistance 36 of the voltage divider 35, resistance 40, the unidirectional conducting device 41 and armature 30 of pilot generator 29. It will be noted that the voltage produced by the pilot generator 29 is in opposition to that produced by the voltage divider 35.

For example, if it be assumed that the speed of the direct current motor 1 decreases to a value below the predetermined value to be maintained, the voltage produced by the pilot generator 29 will decrease, effecting thereby an increase in the resultant unidirectional voltage acting in the circuit which energizes the control winding 28 of the saturable reactance 27. As a result thereof, the current supplied to the control winding 28 is increased, effecting an advance in phase of the alternating voltages impressed on the control members 16 of electric valves 7 and 8, and causing the electric valves to impress on armature member 2 of the direct current motor 1 an increased unidirectional voltage tending to restore the motor speed to the predetermined value. The antihunting circuit including the capacitance 39 and resistance 40 will respond to introduce in the circuit a compensatory effect tending to prevent the overshooting of the controlling action. For example, when the electric valves 7 and 8 increase the voltage applied to the armature member 2, the lower terminal of the armature 2 will be raised to a value more positive than the previously prevailing value and a current will flow through the capacitance 39, armature 30 of pilot generator 29 and resistance 40. This current will be in a direction such that the lower terminal of the resistance 40 will be at a potential positive relative to the upper terminal. The voltage of the resistance 40 is in a direction tending to oppose that occasioned by the change in speed of the motor 1. In other words, the voltage across the resistance 40 tends to decrease the increment of current transmitted to the control winding 28 under the conditions above described. In this manner an anti-hunting action is introduced to prevent overshooting of the controlling action. The unidirectional conducting device 41 insures that only unidirectional current is supplied to the control winding 28. Of course, the system responds to decrease the speed of motor 1, when its speed increases above the desired value.

Fig. 2 illustrates another embodiment of my invention as applied to an electric valve system for variably energizing the excitation or field circuit of the direct current motor 1 to control the speed thereof. The arrangement of Fig. 2 is similar in many respects to that of Fig. 1, and corresponding elements have been assigned like reference numerals. The electric valves 7 and 8 variably energize the excitation circuit 3 of motor 1 to control the speed thereof. The voltage divider 35 is adjusted so that the voltage produced thereby is less than the output voltage of the pilot generator 29.

I provide a serially connected unidirectional conducting device 42, a resistance 43 and a capacitance 44 which are connected to be responsive to the voltage of the excitation or field winding 3 of the motor 1. The unidirectional conducting device 42, resistance 43 and capacitance 44 may be connected in series relation with a resistance 45 so that the complete circuit is connected across the field or excitation winding of machine 1. In this arrangement contact 37 is adjusted so that the voltage supplied by voltage divider 35 is less than that produced by pilot generator 29. A parallel connected capacitance 46 and resistance 47 are connected between the lower terminal of resistance 45 and the positive terminal of the direct current motor 1 to introduce into the control circuit a voltage which varies in accordance with the rate of change of the voltage applied to the terminals of field winding 3.

The embodiment of my invention shown in Fig. 2 operates in substantially the same manner as that explained above in connection with Fig. 1. The field winding 3 of the direct current motor 1 is variably energized from the alternating current circuit 5 through electric valves 7 and 8 in accordance with the speed of the direct current motor 1. The alternating voltages impressed on control members 16 are varied in phase to control the conductivities of the electric valves 7 and 8. Control winding 28 of the saturable inductive reactance 27 is variably energized in accordance with the difference in voltages produced by the pilot generator 29 and the voltage divider 35. The control winding 28 is energized through a circuit including armature 30 of pilot generator 29, the unidirectional conducting device 42, resistance 43 and the upper portion of the resistance 36 of the voltage divider 35.

For example, if it be assumed that the speed of the direct current motor 1 increases to a value above the predetermined value to be maintained, the resultant unidirectional voltage impressed on the control winding 28 is increased due to the increase in voltage of the pilot generator 29. Coincidentally therewith, the unidirectional current supplied to the control winding 28 is increased to effect an advancement in phase of the alternating voltages impressed on the control members 16 of the electric valves 7 and 8 relative to the applied anode-cathode voltages, so that these valves increase the average current transmitted to field winding 3 of direct current motor 1, thereby tending to reduce the speed to the predetermined value. The circuit including the unidirectional conducting device 42, resistance 43, capacitance 44 and the resistance 45 functions to introduce an anti-hunting effect into the circuit for control winding 28 in the following manner. Under the conditions stated, when the electric valves 7 and 8 increase the voltage applied to the field winding 3 of motor 1, a charging current will flow through the circuit including the unidirectional conducting device 42, resistance 43, capacitance 44 and resistance 45. The charging current is in a direction which tends to maintain the left-hand terminal of resistance 43 negative relative to the right-hand terminal, and this voltage is in a direction opposite to the increase in voltage of the pilot generator 29 occasioned by the increase in speed. In this manner, the regulatory action of the voltage of the pilot generator 29 is partially compensated, tending to prevent overshooting of the regulatory action. The capacitance 46 and resistance 45, which are also connected across the field winding 3 of machine 1, tend to stabilize the action of the regulating system by introducing in the circuit for these elements a voltage which tends to limit the anti-hunting action. Of course, the system responds to raise the speed of motor 1 when the speed decreases below the desired value.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current supply circuit, a dynamo-electric machine having excitation and armature circuits, electric translating apparatus for energizing at least one of said circuits from said alternating current circuit and comprising an electric valve means having a control member, an impedance phase shifting circuit comprising an inductive saturable reactance for impressing on said control member a periodic voltage variable in phase relative to the voltage of said alternating current circuit to control the conductivity of said electric valve means, said saturable reactance having a control winding, a pilot generator for producing a unidirectional voltage which varies in magnitude in accordance with a predetermined controlling influence derived from said first mentioned machine for variably energizing said control winding, means for producing a substantially constant unidirectional reference voltage which is greater in magnitude than the voltage of said pilot generator, anti-hunting means comprising a capacitance responsive to the rate of change of an electrical condition of said excitation or armature circuits and a resistance connected in series relation with said capacitance, and a unidirectional conducting device connected in circuit with said control winding and said resistance to assure that only unidirectional current is transmitted to said control winding during voltage variations of said pilot generator.

2. In combination, an alternating current supply circuit, a dynamo-electric machine having excitation and armature circuits, electric translating apparatus for energizing at least one of said circuits from said alternating current circuit and comprising an electric valve means having a control member, an impedance phase shifting circuit comprising an inductive saturable reactance for impressing on said control member a periodic voltage variable in phase relative to the voltage of said alternating current circuit to control the conductivity of said electric valve means, said saturable reactance having a control winding, a pilot generator for producing a voltage which varies in accordance with a predetermined controlling influence derived from said first mentioned machine for variably energizing said control winding, a source of direct current and a voltage divider for producing a substantially constant unidirectional reference voltage greater in magnitude than the voltage of said pilot generator, anti-hunting means comprising a serially connected resistance and a capacitance connected to be responsive to a resultant of the voltage of either of said circuits of said machine and the voltage of said pilot generator for modifying the regulatory action of said periodic voltage, and a unidirectional conducting device connected in circuit with said anti-hunting means and said control winding to assure that only unidirectional current is transmitted to said control winding during voltage variations of said pilot generator thereby limiting the range of phase shift of said periodic voltage.

3. In combination, an alternating current circuit, a dynamo-electric machine having excitation and armature circuits, electric translating apparatus energized from said alternating current circuit for energizing said armature circuit and comprising electric valve means having a control member, an impedance phase shifting circuit for impressing on said control member a periodic voltage variable in phase relative to the voltage of said alternating current circuit to control the conductivity of said electric valve means and comprising a saturable inductive reactance having a control winding, a source of unidirectional voltage, a voltage divider connected to said source to produce a substantially constant unidirectional reference voltage, a pilot generator for producing a voltage which is smaller in magnitude than said reference voltage and opposes said unidirectional reference voltage and which varies in accordance with a predetermined controlling influence derived from said first mentioned machine for variably energizing said control winding, anti-hunting means including a serially connected resistance and a capacitance connected in circuit with said armature circuit, said voltage divider and said control winding to modify the energization of said control winding in accordance with the rate of change of the voltage of said armature circuit, and a unidirectional conducting device connected in circuit with said anti-hunting means and said control winding to assure that only unidirectional current is transmitted to said control winding during voltage variations of said pilot generator.

4. In combination, an alternating current circuit, a dynamo-electric machine having excitation and armature circuits, electric translating apparatus energized from said alternating current circuit for energizing said armature circuit and comprising electric valve means having a control member, an impedance phase shifting circuit for impressing on said control member a periodic voltage variable in phase relative to the voltage of said alternating current circuit to control the conductivity of said electric valve means and comprising a saturable inductive reactance having a control winding, a source of unidirectional voltage, a voltage divider connected across said source to provide a substantially constant unidirectional reference voltage, a pilot generator for producing a voltage which is of smaller magnitude than said reference voltage and opposes said unidirectional voltage and which varies in accordance with a predetermined controlling influence derived from said first mentioned machine for variably energizing said control winding, anti-hunting means comprising a serially connected resistance and a capacitance connected in circuit with the armature circuit, said voltage divider and said control winding to control the energization of said control winding in accordance with the rate of change of the voltage of said armature winding, and a unidirectional conducting device connected in series relation with said control winding and said armature circuit to assure that only unidirectional current is supplied to said control winding during voltage variations of said pilot generator.

5. In combination, an alternating current supply circuit, a dynamo-electric machine having excitation and armature circuits, electric translating apparatus energized from said alternating current circuit for energizing said excitation circuit and comprising an electric valve means having a control member, an impedance phase shifting circuit for impressing on said control member a periodic voltage variable in phase relative to the voltage of said alternating current circuit for controlling the conductivity of said electric valve means and comprising a saturable inductive reactance having a control winding, means for producing a substantially constant reference voltage, a pilot generator for producing a voltage which is smaller in magnitude than said reference voltage and which varies in accordance with a predetermined controlling influence derived from said first mentioned machine for variably energizing said control winding, and anti-hunting means connected across said excitation circuit and comprising a serially connected unidirectional conducting device, a capacitance and a resistance for modifying the effect of the voltage of said pilot generator in accordance with the rate of change of the voltage applied to said excitation circuit, said unidirectional conducting device serving to assure that only unidirectional current is transmitted to said control winding during voltage variations of said pilot generator.

GEORGE W. GARMAN.